United States Patent
Chin-Chung et al.

(10) Patent No.: US 11,720,177 B1
(45) Date of Patent: Aug. 8, 2023

(54) COAXIAL INDEPENDENT HAPTIC FORCE SENSING UNIT

(71) Applicant: DELL PRODUCTS L.P., Round Rock, TX (US)

(72) Inventors: Wu Chin-Chung, Yonghe Dist. (TW); Yong-Teng Lin, Yilan (TW); Chun-Kai Tzeng, KeeLung (TW); Bradford Edward Vier, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/970,044

(22) Filed: Oct. 20, 2022

(51) Int. Cl.
*G06F 3/01* (2006.01)
*G06F 3/044* (2006.01)
*G06F 3/041* (2006.01)

(52) U.S. Cl.
CPC .............. *G06F 3/016* (2013.01); *G06F 3/044* (2013.01); *G06F 3/04144* (2019.05); *G06F 2203/04106* (2013.01)

(58) Field of Classification Search
CPC ...... G06F 3/046; G06F 3/044; G06F 3/04144; G06F 2203/04106
See application file for complete search history.

(56) References Cited

U.S. PATENT DOCUMENTS

| | | | | |
|---|---|---|---|---|
| 6,396,199 | B1 * | 5/2002 | Douglas | G10K 11/32 310/334 |
| 9,218,073 | B1 | 12/2015 | Kremin et al. | |
| 9,746,968 | B1 * | 8/2017 | McKown | G06F 3/0445 |
| 10,318,083 | B1 * | 6/2019 | McKown | G06F 3/016 |
| 10,429,126 | B2 * | 10/2019 | Park | F25D 23/028 |
| 10,802,651 | B2 * | 10/2020 | Khajeh | G06F 3/0412 |
| 11,127,547 | B1 * | 9/2021 | Wang | G06F 1/1684 |
| 2012/0086651 | A1 * | 4/2012 | Kwon | G06F 3/045 345/173 |
| 2013/0194759 | A1 * | 8/2013 | Kang | G06F 3/04164 361/679.01 |
| 2013/0335371 | A1 * | 12/2013 | Bayramoglu | G06F 3/04144 345/174 |
| 2015/0378514 | A1 * | 12/2015 | Keski-Jaskari | G01L 1/16 73/777 |
| 2018/0081441 | A1 * | 3/2018 | Pedder | G06F 3/03547 |
| 2020/0401228 | A1 * | 12/2020 | Wen | G06F 3/04166 |
| 2021/0240268 | A1 * | 8/2021 | Knoppert | G06F 3/03547 |
| 2022/0317805 | A1 * | 10/2022 | Yip | G06F 3/04166 |

FOREIGN PATENT DOCUMENTS

EP 2990910 A1 3/2016

* cited by examiner

*Primary Examiner* — Darlene M Ritchie
(74) *Attorney, Agent, or Firm* — Larson Newman, LLP

(57) ABSTRACT

A touch panel device includes a face plate, a force-feedback device, and a touch panel circuit. The face plate receives at a first surface a contact with the face plate. The force-feedback device includes a PCB affixed by a first surface of the PCB to a second surface of the face plate. The PCB includes a first metallic ring on a second surface of the PCB. The piezo disc includes a piezoelectric wafer and a second metallic ring. The piezo disc is adjacent to the second surface of the PCB. The touch panel circuit is coupled to the first metallic ring, the second metallic ring, and the piezoelectric wafer. The touch panel circuit determines a capacitance between the first metallic ring and the second metallic ring, determines a force associated with the contact based upon the capacitance, and triggers a haptic feedback response in the piezoelectric wafer.

20 Claims, 4 Drawing Sheets

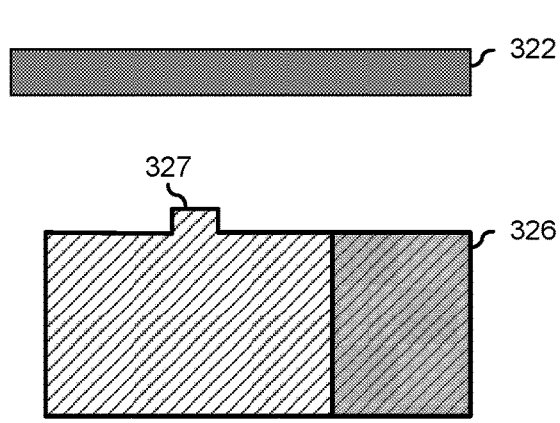
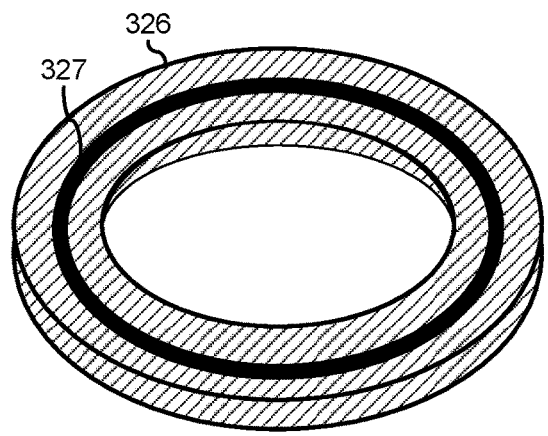
*FIG. 3A*  *FIG. 3B*
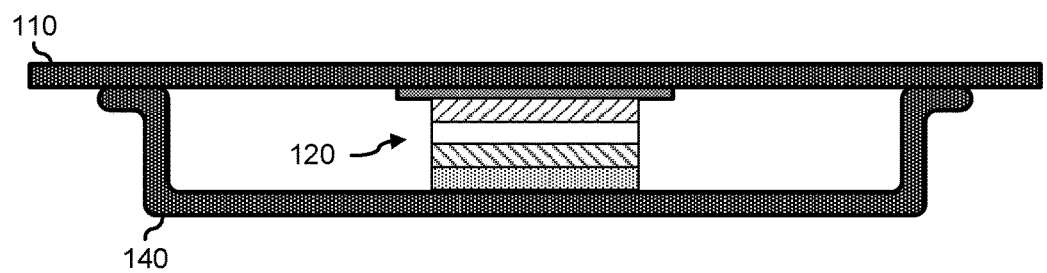
*FIG. 4*
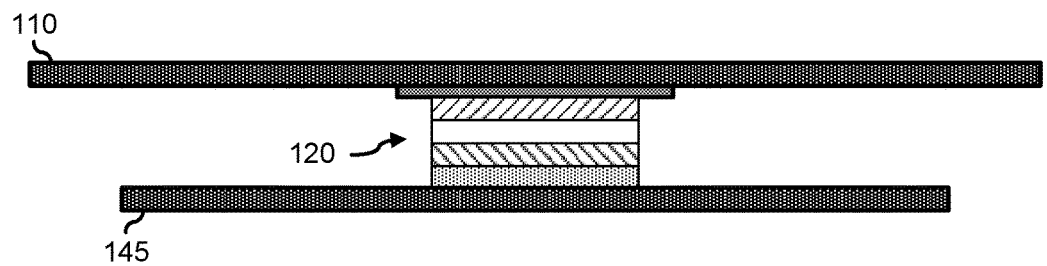
*FIG. 5*

COAXIAL INDEPENDENT HAPTIC FORCE SENSING UNIT

FIELD OF THE DISCLOSURE

This disclosure generally relates to information handling systems, and more particularly relates to providing a coaxial independent haptic force sensing unit for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A touch panel device may include a face plate, a force-feedback device, and a touch panel circuit. The face plate may receive at a first surface a contact with the face plate. The force-feedback device may include a PCB affixed by a first surface of the PCB to a second surface of the face plate. The PCB may include a first metallic ring on a second surface of the PCB. The piezo disc may include a piezoelectric wafer and a second metallic ring. The piezo disc may be adjacent to the second surface of the PCB. The touch panel circuit may be coupled to the first metallic ring, the second metallic ring, and the piezoelectric wafer. When a contact is received at the first surface of the face plate, the PCB may move closer to the piezo disc. In response, the touch panel circuit may determine a capacitance between the first metallic ring and the second metallic ring, determine a force associated with the contact based upon the capacitance, and trigger a haptic feedback response in the piezoelectric wafer.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 3A and 3B illustrate portions of the touch panel assembly of FIG. 1;

FIG. 4 illustrates the touch panel assembly of FIG. 1;

FIG. 5 illustrates a touch panel assembly according to an embodiment of the current disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
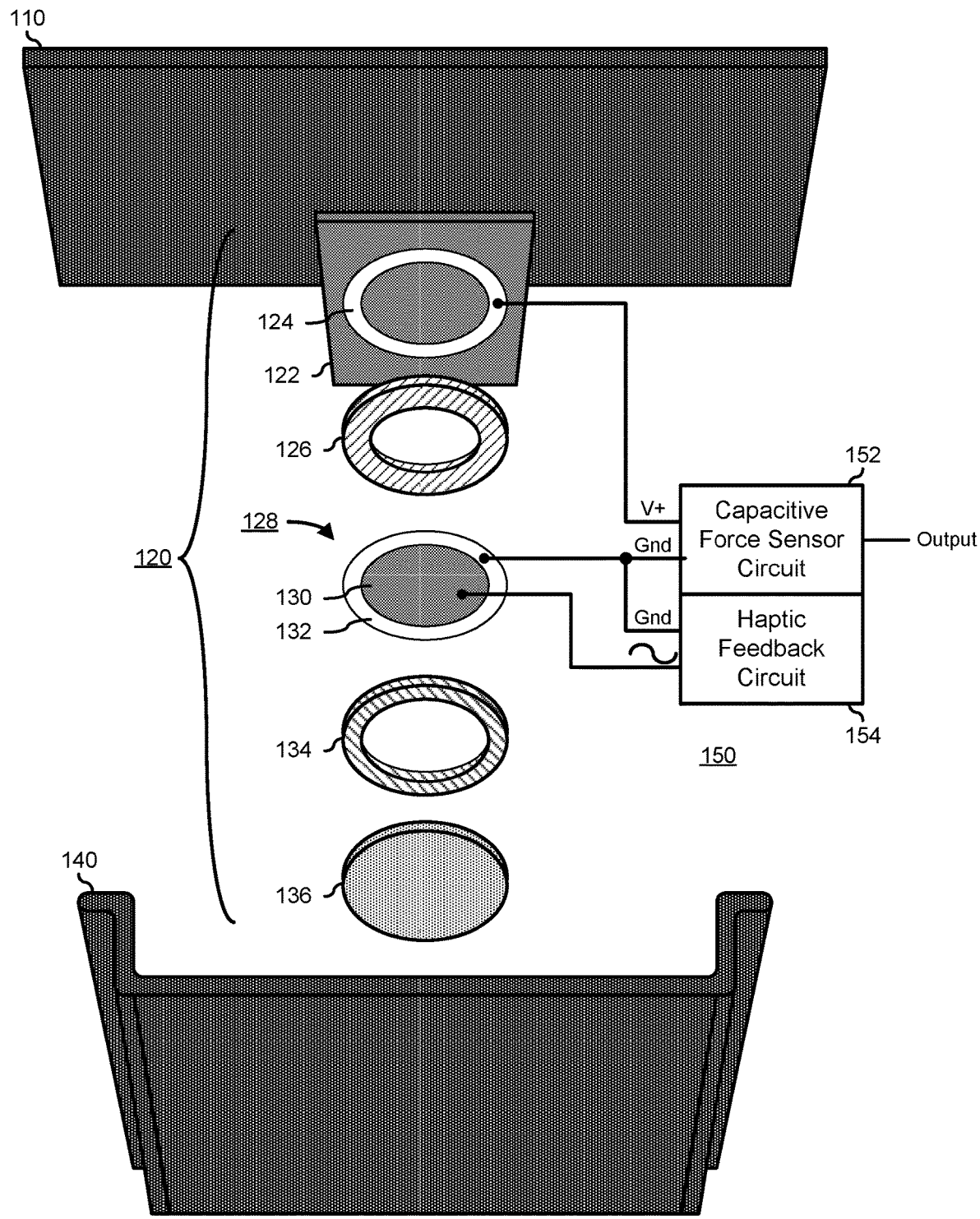
FIG. 1 is a block diagram of a touch panel assembly according to an embodiment of the current disclosure.

FIG. 1 illustrates a touch panel device 100 including a face plate 110, a force-detection and haptic feedback ("force-feedback") device 120, a support bracket 140, and a touch panel circuit 150. Touch panel device 100 provides for the detection of the depression of face plate 110, such as by a finger, a stylus, or another mechanical actuator configured to provide a localized force on the surface of the face plate. Moreover, touch panel device 100 is configured to measure the amount of force provided in the depression of face plate 110, and to give a haptic feedback to the depression of the face plate. Touch panel device 100 may represent a stand-alone push button device, such as a power button for an information handling system, may represent a part of a larger device with one or more additional pushbutton assemblies, such as a key pad, may represent an integrated touch panel device with one or more pushbutton assemblies at particular locations for providing specific functions, such as where a cellular or tablet device includes a touch panel with a designated "home" button, or the like.

Force-feedback device 120 includes a printed circuit board (PCB) 122, an elastic ring 126, a piezo disc 128, an adhesive ring 134, and a rigid mounting disc 136. Force-feedback device 120 is assembled such that elastic ring 126 is situated between a bottom side of PCB 122 and a top side of piezo disc 128, and adhesive ring 134 is adhered between a bottom side of piezo disc 128 and a top side of mounting disc 136. Touch panel device 100 is assembled such that a bottom surface of mounting disc 136 is affixed to a top side of support bracket 140, and a top side of PCB 122 is affixed to a bottom side of face plate 110.

In a particular embodiment, face plate 110 represents a rigidly affixed but flexible surface that provides an elastic deformation in response to a force applied at the surface of the face plate. In another embodiment, face plate 110 represents a button cover, such as a keyboard cap, a discrete pushbutton cap, or the like that moves downward in response to a force applied at the surface of the face plate. In either embodiment, the deformation/movement of face plate 110 is transmitted to force-feedback device 120 to compress the force-feedback device. The compression of force-feedback device 120 is detected and transmitted to touch panel circuit 150, and the touch panel circuit initiates a feedback to vibrate force-feedback device 120, as described further below. The vibration of force-feedback device 120 is transmitted back to face plate 110 to provide haptic feedback to the initiator of the force applied to the face plate. Support bracket 140 provides a rigid mounting surface for at least force-feedback device 120, and, in some embodiments, to face plate 110, as described further below. Support bracket 140 provides a rigid base against the force applied to touch panel device 100. In a particular embodiment, touch panel device 100 represents a complete assembly which may be mounted within a rigid structure. In another embodiment, support bracket 140 represents a portion of a rigid structure, into which force-feedback device 120 is installed, and to which face plate 110 is applied.

In detecting a force applied to the top surface of face plate 110, force-feedback device 120 acts as a capacitive force sensor. As such, PCB 122 includes a metallic ring 124 on the bottom surface of the PCB. Piezo disk 128 includes an inner piezoelectric wafer 130 that is retained by a metallic ring 132. Touch panel circuit 150 includes a capacitive force sensor circuit 152 and a haptic feedback circuit 154. Metallic ring 124 is connected to a first input of capacitive force sensor circuit 152, and metallic ring 132 is connected to a second input of the capacitive force sensor circuit. Capacitive force sensor circuit 152 places a voltage (V+) on metallic ring 124 and ties metallic ring 130 to a ground plane, thus providing a detectable static-state capacitance between the metallic rings.

Figure 2A:
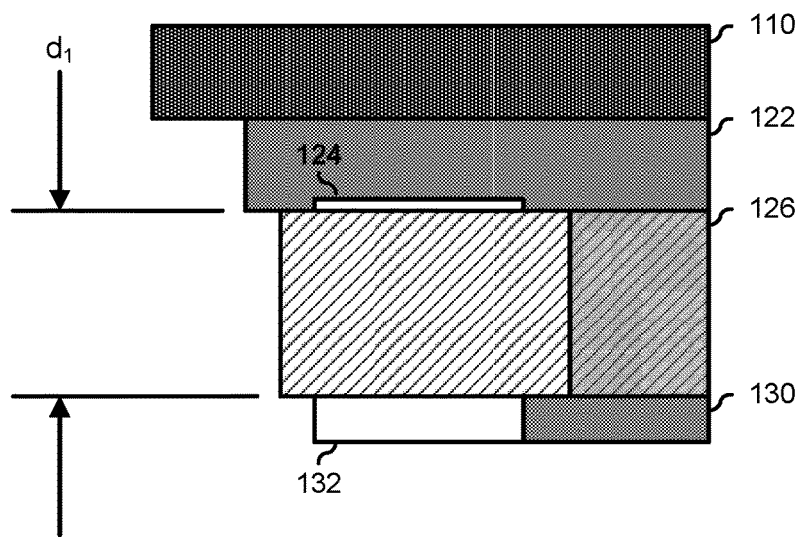
FIG. 2A illustrates a portion of the touch panel device of FIG. 1 with no force applied to a surface of the touch panel device.
Figure 2B:
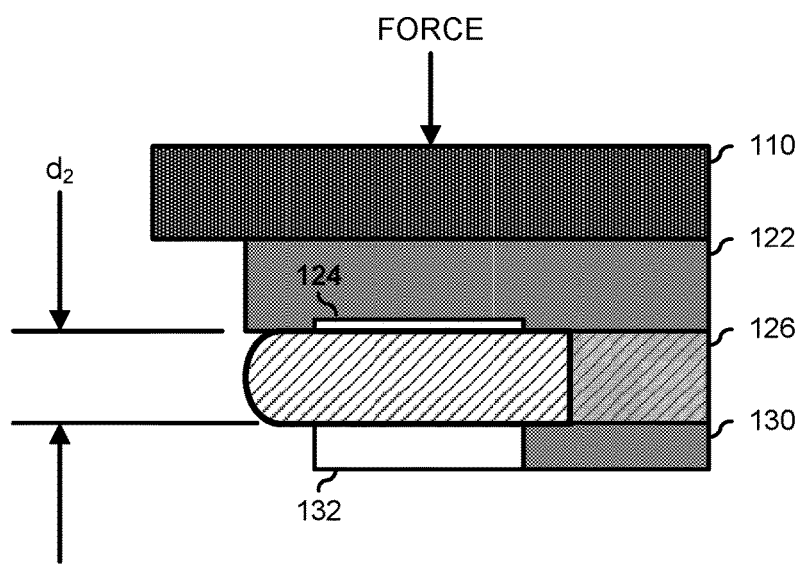
FIG. 2B illustrates a portion of the touch panel device of FIG. 1 with a force applied to a surface of the touch panel device.

FIGS. 2A and 2B show a portion of force/feedback device 120 which illustrates the operation of the force detection operation of the force/feedback device. In FIG. 2A, no force is exerted on the top surface of face plate 110. In this relaxed state, elastic ring 126 is uncompressed and metallic ring 124 and metallic ring 132 are a known initial distance ($d_1$) apart, and form a known initial capacitance that is detected by capacitive force sensor circuit 152. In FIG. 2B, a force is shown being exerted on the top surface of face plate 110. The force operates to deform face plate 110, and to compress elastic ring 126 such that metallic ring 124 and metallic ring 132 are a distance ($d_2$) apart that is less than the initial distance ($d_1$). This results in a higher capacitance value between metallic ring 124 and metallic ring 132. Capacitive force sensor circuit 152 operates to provide a force correlation table that correlates the distance between metallic ring 124 and metallic ring 132 with the associated capacitance exhibited between the metallic rings, and calculates a force associated with the detected capacitance.

The force correlation table may represent distances in millimeters (mm), inches, or the like, may represent capacitances in pico Farads (pF), nano Farads (nF), or the like, and may represent forces in grams-force (gmF), kilograms-force (kgf), ounces-force (ozf), pounds-force (lbf), or the like, as needed or desired. Note that the force correlation table is provided for illustrative purposes, and the values of a particular implementation of a force/feedback device may likely result in different correlations between the distances, the resulting capacitances, and the calculated forces. Capacitive force sensor circuit 142 includes an output configured to output an indication of the force detected by the capacitive force sensor circuit, for example to an information handling system that includes touch panel device 100. The correlation of plate distances to capacitance, the correlation of compression of elastic materials to the force applied, and the design of circuits to provide a capacitive force sensor circuit are known in the art and will not be further described herein, except as may be needed to illustrate the current embodiments.

Returning to FIG. 1, n providing a haptic feedback to the depression of face plate 110, force-feedback device 120 acts as a piezoelectric oscillator to provide a vibration in response to detecting a force applied to the top surface of the face plate. Piezo disc 128 operates to mechanically expand and contract in the presence of a voltage. Thus metallic ring 132 is connected to a ground contact of haptic feedback circuit 154, and piezoelectric wafer 130 is connected to a signal output of the haptic feedback circuit. Metallic ring 132 is grounded with respect to both the capacitive force sensing described above, and the haptic feedback as here described. Haptic feedback circuit 154 provides an oscillating signal on the output which causes piezoelectric wafer 130 to alternately expand and contract, setting up a vibration in piezo disc 128. In a particular embodiment haptic feedback circuit 154 provides the oscillating signal when capacitive effect force sensor circuit 152 detects a force that exceeds a particular threshold.

In another embodiment, haptic feedback circuit 154 provides varying levels of the oscillating signal in response to different force levels detected by capacitive effect force sensor circuit 152. For example, a low level oscillating signal can be provided for a light force, a mid level oscillating signal can be provided for a heavier force, and a high level oscillating signal can be provided for a heavy force. In another embodiment, the oscillating signal increases linearly with increasing detected force levels. For example, the oscillating signal may be proportional to the detected force levels. The details of providing an oscillating signal by a haptic feedback circuit are known in the art and will not be further described herein, except as may be needed to illustrate the current embodiments.

Adhesive ring 134 is adhered between a bottom side of piezo disc 128 and a top side of mounting disc 136, and forms a rigid coupling between the piezo disc and the mounting disc. Thus, with mounting disc 136 affixed to support bracket 140, the vibration of piezo disc 128 is transmitted upward to face plate 110 to provide haptic feedback to the initiator of the force applied to the face plate. Support bracket 140 provides a rigid mounting surface for at least force-feedback device 120, and, in some embodiments, to face plate 110. Adhesive ring 134 is shown with a hole in the adhesive material that substantially matches the profile of piezoelectric wafer 130. A typical piezoelectric wafer is fabricated of a ceramic material and may be brittle. Thus a piezoelectric wafer may be subject to cracking in response to vibrations of the piezoelectric wafer, particularly when the piezoelectric wafer is rigidly affixed to a structural support member. The hole in adhesive ring 134 provides that the adhesive material contacts metallic ring 132, but does not substantially constrain the vibration of piezoelectric wafer 130, thereby reducing cracking in the piezoelectric wafer. Further, the combination of capacitive force detection and haptic feedback utilizing a common ground in metallic ring 132 permits a lower profile for force/feedback device 128.

FIGS. 3A and 3B illustrate a PCB 322 similar to PCB 122, and an elastic ring 326 similar to elastic ring 126. Elastic ring 326 is formed with a circular ridge 326. When PCB 322 and elastic ring 326 are fitted together, circular ridge 327 provides a preload force against PCB 322 when the elastic ring is assembled to the PCB. This preload force may operate to flatten a piezo disc in the case of any warpage of the piezo disk, and ensures an optimal assembly clearance such that the stack up has a tight assembly fit. In other words, any pressure provided in the assembly process is taken up by circular ridge 327, leaving the deformation of elastic ring 326 to deform only under the pressure of an exerted force on the surface of the assembly.

FIG. 4 illustrates touch panel device 100 in an assembled form. Flanges on support bracket 140 are provided in contact with face plate 110 to form a seamless assembly. Any vibration of piezoelectric wafer 130 is fed back to face plate 110 through support bracket 140. FIG. 5 illustrates an alternate embodiment of the assembled form of touch panel device 100. In this case, a modified support bracket 145 is provided that does not directly interface with face plate 110.

Figure 6:
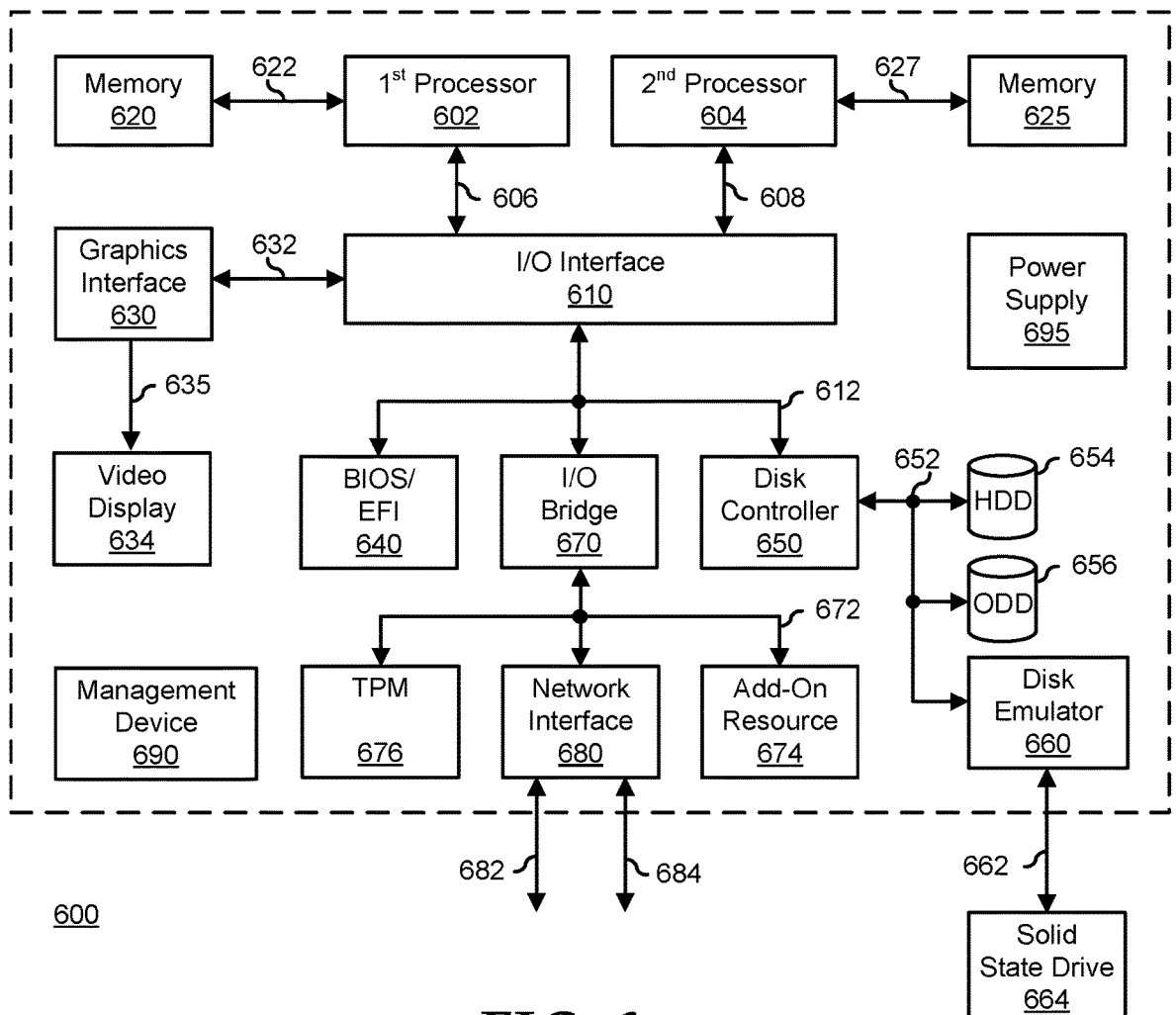
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620 and 625, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 635 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on a separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A touch panel device, comprising:
    a face plate configured to receive at a first surface a contact with the face plate;
    a force-feedback device including:
        a printed circuit board (PCB) affixed by a first surface of the PCB to a second surface of the face plate and including a first metallic ring on a second surface of the PCB; and
        a piezo disc including a piezoelectric wafer and a second metallic ring, the piezo disc being adjacent to the second surface of the PCB; and
    a touch panel circuit coupled to the first metallic ring, the second metallic ring, and the piezoelectric wafer, wherein when a first contact is received at the first surface of the face plate, the PCB moves closer to the piezo disc and in response, the touch panel circuit determines a first capacitance between the first metallic ring and the second metallic ring, determines a first force associated with the first contact based upon the first capacitance, and triggers a first haptic feedback response in the piezoelectric wafer.

2. The touch panel device of claim 1, further comprising an elastic ring situated between the PCB and the piezo disc.

3. The touch panel device of claim 2, wherein when no contact is received at the first surface of the face plate, the elastic ring maintains a first distance between the PCB and the piezo disc.

4. The touch panel device of claim 3, wherein further when no contact is received at the first surface, the touch panel circuit determines a second capacitance between the first metallic ring and the second metallic ring, and associates the second capacitance with a zero force on the first surface of the face plate.

5. The touch panel device of claim 2, wherein further when the first contact is received at the first surface, the elastic ring is compressed to a second distance between the PCB and the piezo disc.

6. The touch panel device of claim 2, wherein the PCB is formed with a circular groove and the elastic ring is formed with a circular ridge, such that when the PCB the and elastic ring are fitted together, the circular ridge fits into the circular groove to secure the elastic ring to the PCB.

7. The touch panel device of claim 1, further comprising:
    an adhesive ring adhered by a first surface of the adhesive ring to a second surface of the piezo disc; and
    a mounting disc adhered by a first surface of the mounting disc to a second surface of the adhesive ring.

8. The touch panel device of claim 7, wherein the adhesive ring alleviates cracking in the piezoelectric wafer.

9. The touch panel device of claim 1, wherein in triggering the haptic response in the piezoelectric wafer, the touch panel circuit provides an oscillating signal to the coil.

10. The touch panel device of claim 7, wherein the oscillating signal is proportional to the first force.

11. A method, comprising:
receiving, at a first surface of a face plate of a touch panel device, a contact with the face plate;
affixing a first surface of a force-feedback device to a second surface of the touch panel;
affixing a first surface of a printed circuit board (PCB) of the force-feedback device to a second surface of the face plate;
providing a first metallic ring on a second surface of the PCB;
suspending a piezo disc adjacent to the second surface of the PCB, the piezo disc including a piezoelectric wafer and a second metallic ring;
receiving, at the first surface of the face plate, a first contact, wherein when the first contact is received, the PCB moves closer to the piezo disc;
determining, by a touch panel circuit coupled to the first metallic ring, the second metallic ring, and the piezoelectric wafer, a first capacitance between the first metallic ring and the second metallic ring;
determining a first force associated with the first contact based upon the first capacitance; and
providing, by the touch panel circuit, a first haptic feedback response in the piezoelectric wafer.

12. The method of claim 11, further comprising positioning an elastic ring between the PCB and the piezo disc.

13. The method of claim 12, wherein when no contact is received at the first surface of the face plate, the method further comprises maintaining, by the elastic ring, a first distance between the PCB and the piezo disc.

14. The method of claim 3, wherein further when no contact is received at the first surface, the method further comprises:
determining a second capacitance between the first metallic ring and the second metallic ring; and
associating the second capacitance with a zero force on the first surface of the face plate.

15. The method of claim 12, wherein when the first contact is received at the first surface, the method further comprises compressing the elastic ring to a second distance between the PCB and the piezo disc.

16. The method of claim 12, further comprising:
forming, in the PCB, a circular groove; and
forming, in the elastic ring, a circular ridge, such that when the PCB and elastic ring are fitted together, the circular ridge fits into the circular groove to secure the elastic ring to the PCB.

17. The method of claim 12, further comprising:
adhering a first surface of an adhesive ring to a second surface of the piezo disc; and
adhering a first surface of a mounting disc to a second surface of the adhesive ring.

18. The touch panel of claim 7, wherein the adhesive ring alleviates cracking in the piezoelectric wafer.

19. The touch panel device of claim 1, wherein in triggering the haptic response in the piezoelectric wafer, the method further comprises providing, by the touch panel circuit, an oscillating signal to the coil.

20. An information handling system, comprising:
a processor; and
a touch panel device including:
a face plate configured to receive at a first surface a contact with the face plate;
a force-feedback device including:
a printed circuit board (PCB) affixed by a first surface of the PCB to a second surface of the face plate and including a first metallic ring on a second surface of the PCB; and
a piezo disc including a piezoelectric wafer and a second metallic ring, the piezo disc being adjacent to the second surface of the PCB; and
a touch panel circuit coupled to the first metallic ring, the second metallic ring, and the piezoelectric wafer, wherein when a first contact is received at the first surface of the face plate, the PCB moves closer to the piezo disc and in response, the touch panel circuit determines a first capacitance between the first metallic ring and the second metallic ring, determines a first force associated with the first contact based upon the first capacitance, triggers a first haptic feedback response in the piezoelectric wafer, and provides an indication of the force to the processor.

* * * * *